Figure 1:

Aug. 3, 1965  S. E. FISHER  3,198,173

COILED RAWHIDE ANIMAL TOY

Filed Feb. 20, 1964

INVENTOR.
STANTON E. FISHER
BY *Sidney B. Ring*
ATTORNEY 3,198,173
COILED RAWHIDE ANIMAL TOY
Stanton E. Fisher, % Sidney B. Ring, Petrolite Corp., 369 Marshall Ave., St. Louis 19, Mo.
Filed Feb. 20, 1964, Ser. No. 346,144
4 Claims. (Cl. 119—29)

This invention relates to toys and more particularly to animal toys. Most particularly, this invention relates to a rawhide toy having a coiled configuration, which is characterized by being rawhide formed into spiral, helical, coiled, springlike, etc. configurations.

Animal toys for carnivorous animals such as dogs have become increasingly popular in recent years. Animals are particularly fond of rawhide. Because of its animal origin it has an animal odor which is appealing to dogs. Although hard, it has a certain amount of "give" when chewed. Since it does not readily disintegrate, it is a long-lasting product. If a piece of rawhide is swallowed by the dog, it can be digested by the animal in the manner of meat.

Furthermore, dog owners do not object to rawhide since it is harmless to the dog and non-staining to furniture, floor covering; clothing, or other household effects. Thus, it can be seen that rawhide is a very satisfactory material from which to prepare animal toys.

In addition to being made of a suitable and appealing material such as rawhide, an animal toy should have an appealing configuration so that dogs are attracted to it.

I have now discovered an appealing toy which is characterized by being rawhide formed into a spiral, helical, coiled, springlike, etc. configuration. It may be spirally formed on one plane or on a plurality of planes. It is particularly appealing since it is a dynamic kinetic toy which rolls, bounces, springs, or reacts in an infinite variety of ways when the animal plays with it.

Spiral rawhide of this invention can be prepared in any number of ways. Strips of moist rawhide (which are flexible when wet) having any suitable dimensions may be employed. For example, a strip of rawhide may be employed having a width of from about $1/16$ to 3 or more inches, such as from about $1/8$ to 1, but preferably from $1/2$ to $3/4$ inch; a thickness of from about $1/64$ to $1/2$ or more inch, such as from $1/32$ to $1/4$, but preferably about $1/16$–$1/8$ inch; and a length of from about 6 to 36 or more inches, such as 10 to 30, but preferably from 12 to 24 inches.

These moistened strips of rawhide are then formed into the shape of a spiral by a suitable means. This is conveniently done by wrapping moist rawhide around any suitable device such as a mandrel and the like thus forming a spiral, securing it thereto, and maintaining it in this shape until dried. Drying may be effected by any suitable means, such as by employing a circulating hot air oven. The dried product, when removed from the mandrel, is stiff and hard but resilient. It is a dynamic-kinetic toy since it rolls, bounces, springs and reacts in an infinite variety of ways to forces exerted upon it.

In addition to preparing a spiral on a straight mandrel, the spiral can also be prepared on a curved mandrel or on a plurality of mandrels joined at angles so that the spiral formed exists on a plurality of planes or a combination of planes.

The following describes non-limiting examples of methods of preparing a product of this invention.

EXAMPLE

Figure 2:
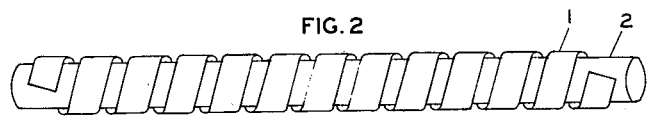
Figure 3:
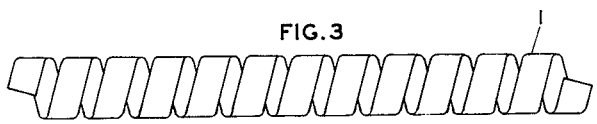

A strip of moist rawhide 1 of FIGURE 1 of approximately $3/4$ inch in width, $1/8$ inch in thickness and 12 inches in length is wrapped around a mandrel 2 in the manner shown in FIGURE 2. This strip of rawhide is allowed to remain in this position until dry. When removed, it is then coiled into the configuration shown in FIGURE 3 which will roll, bounce, spring and react in an infinite variety of ways.

Figure 4:
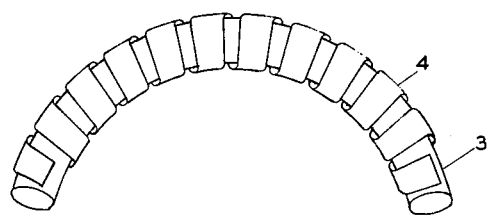
Figure 5:
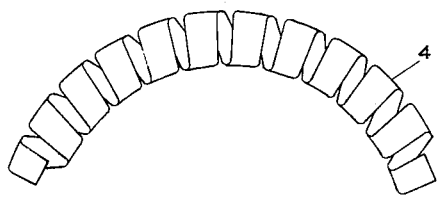

FIGURES 4 and 5 describe a strip of rawhide 4 coiled around a curved mandrel 3 so that the coiled rawhide when removed from the mandrel has the coiled configuration shown in FIGURE 5.

Figure 6:
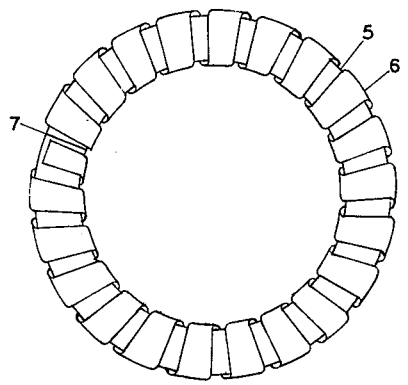
Figure 7:
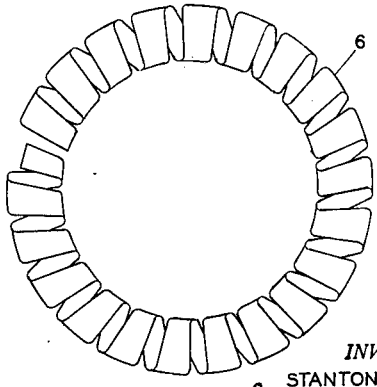

FIGURES 6 and 7 describe a coiled product prepared by winding the segment of rawhide 6 around a circular mandrel 5. When the product is removed from the circular mandrel through a split therein 7, the product 6 has the configuration shown in FIGURE 7. If desired the ends of the circular coiled rawhide segment may be joined.

The above are merely exemplary of this invention. It should be understood that many variations are possible with the scope and spirit of this invention.

It is to be noted that the product of this invention is of unitary construction having neither hardware such as staples therein, for the dog's safety, stitches nor other devices to be broken or dislodged.

The use of rawhide is critical to this invention. When denatured leather such as tanned leather is employed, the product is not as appealing to dogs since the appearance and appeal of natural, undenatured protein is lost. Furthermore, unlike tanned leather, the instant product is non-staining.

Rawhide leather is an animal skin or hide which has been de-haired and then dried. No tanning is involved in its manufacture. Suitable denfiitions of rawhide can be found in many texts on leather, for example, in the hide, leather and shoe encyclopedia.

Having thus described my invention what I claim as new and desire to obtain by Letters Patent is

1. An exercising and plaything device for animals comprising a strip of rawhide wound and rolled into an elongated, corkscrew shaped, loosely coiled configuration.

2. The device of claim 1 wherein said strip is long and relatively narrow.

3. The device of claim 1 wherein the axis of the coiled configuration is arcuate.

4. The device of claim 1 wherein the axis of the coiled configuration is annular.

References Cited by the Examiner
UNITED STATES PATENTS

| | | | |
|---|---|---|---|
| 2,185,547 | 1/40 | Fowler | 119—29.5 |
| 2,988,045 | 6/61 | Fisher | 119—29 |
| 3,107,651 | 10/63 | Beck | 119—29 |

SAMUEL KOREN, *Primary Examiner.*
ALDRICH F. MEDBERY, *Examiner.*